(12) United States Patent
Vahldiek et al.

(10) Patent No.: US 10,928,165 B2
(45) Date of Patent: Feb. 23, 2021

(54) METHOD FOR PRODUCING A BODY ARMOR

(71) Applicant: Mehler Engineered Defence GmbH, Königslutter (DE)

(72) Inventors: Christian Vahldiek, Schöningen (DE); Frank Krieger, Helmstedt (DE)

(73) Assignee: MEHLER ENGINEERED DEFENCE GMBH, Koenigslutter (DE)

( * ) Notice: Subject to any disclaimer, the term of this patent is extended or adjusted under 35 U.S.C. 154(b) by 94 days.

(21) Appl. No.: 16/207,805

(22) Filed: Dec. 3, 2018

(65) Prior Publication Data
US 2019/0170485 A1    Jun. 6, 2019

(30) Foreign Application Priority Data

Dec. 4, 2017 (DE) .................. 10 2017 128 764.7

(51) Int. Cl.
| F41H 5/04 | (2006.01) |
| F41H 1/02 | (2006.01) |
| B32B 38/00 | (2006.01) |
| A41D 31/24 | (2019.01) |

(52) U.S. Cl.
CPC ............ *F41H 5/0457* (2013.01); *F41H 1/02* (2013.01); *F41H 5/0492* (2013.01); *A41D 31/24* (2019.02); *A41D 2500/52* (2013.01); *B32B 38/0012* (2013.01); *F41H 5/0421* (2013.01); *F41H 5/0428* (2013.01); *Y10T 156/1002* (2015.01)

(58) Field of Classification Search
CPC ......... Y10T 156/1002; Y10T 156/1052; Y10T 156/1062; F41H 5/0457; F41H 5/0492; B32B 38/0012
See application file for complete search history.

(56) References Cited

U.S. PATENT DOCUMENTS 5,515,541 A * 5/1996 Sacks .................... F41H 5/023
                                                            2/2.5
5,601,895 A    2/1997 Cunningham

FOREIGN PATENT DOCUMENTS

| DE | 692 00 956 T2 | 8/1995 |
| DE | 20 2006 019 712 U1 | 4/2008 |
| DE | 10 2016 202 546 A1 | 8/2017 |
| EP | 1 720 775 B1 | 8/2008 |

* cited by examiner

*Primary Examiner* — Carson Gross
(74) *Attorney, Agent, or Firm* — W&C IP

(57) ABSTRACT

The invention relates to a method for producing a body armor with several armor elements (4) that are connected to one another, wherein the method comprises the following steps:
a) supply of an armor blank (2) with at least two armor elements (4) which are connected to one another or in a fixed position relative to one another,
b) reshaping of the armor blank (2) in at least one reshaping direction such that the at least two armor elements (4) are reshaped,
c) separation of the at least two connected armor elements (4) from one another and
d) flexible connection of the separated armor elements (4).

7 Claims, 5 Drawing Sheets

Figure 7:
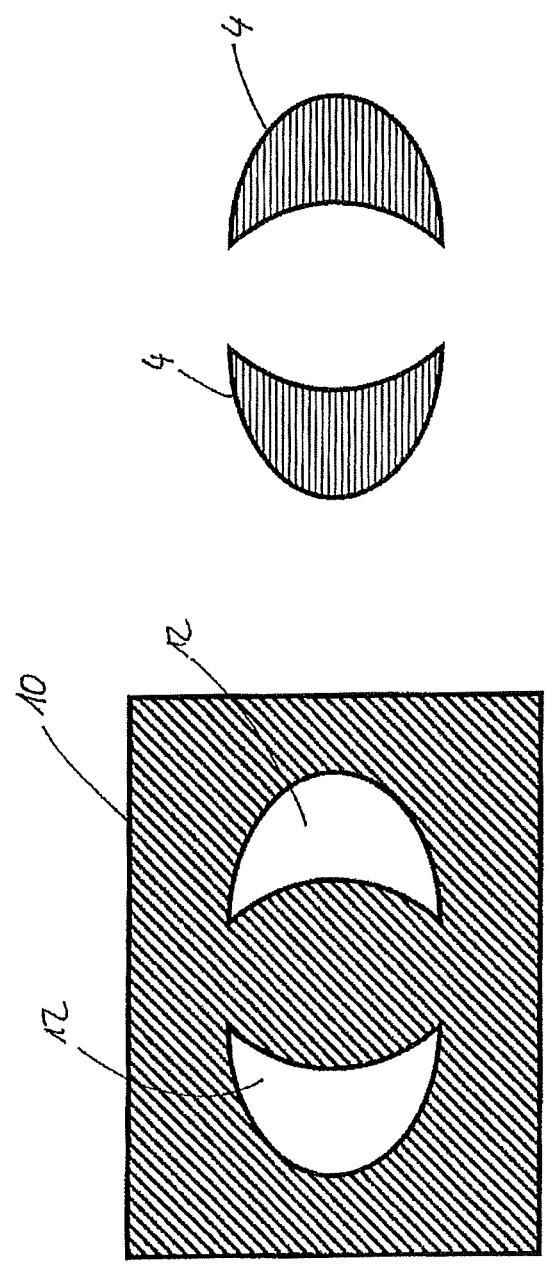

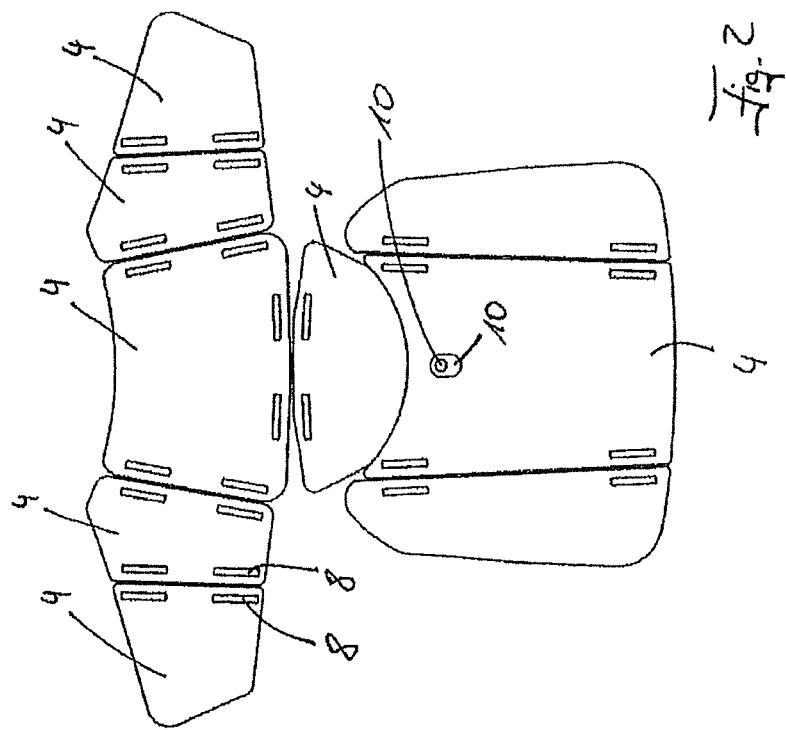
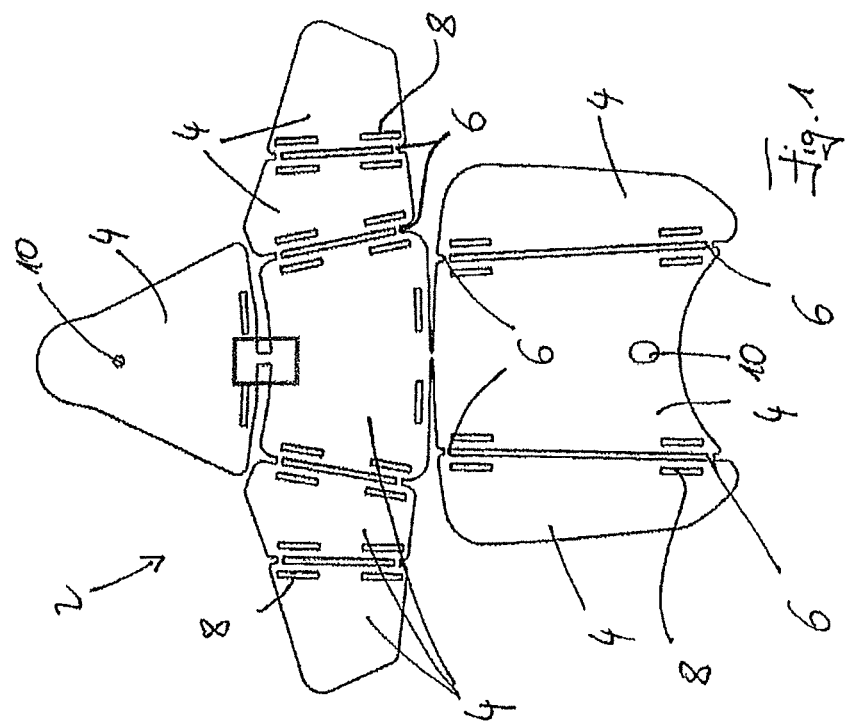

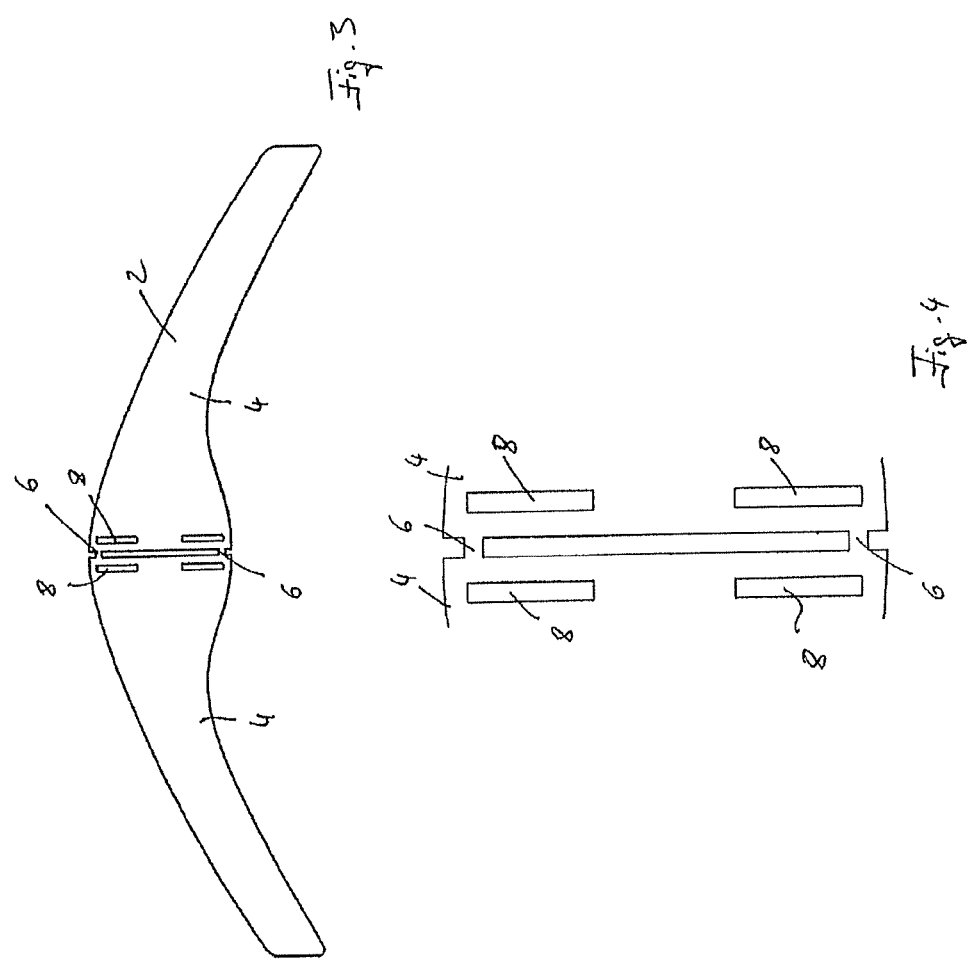

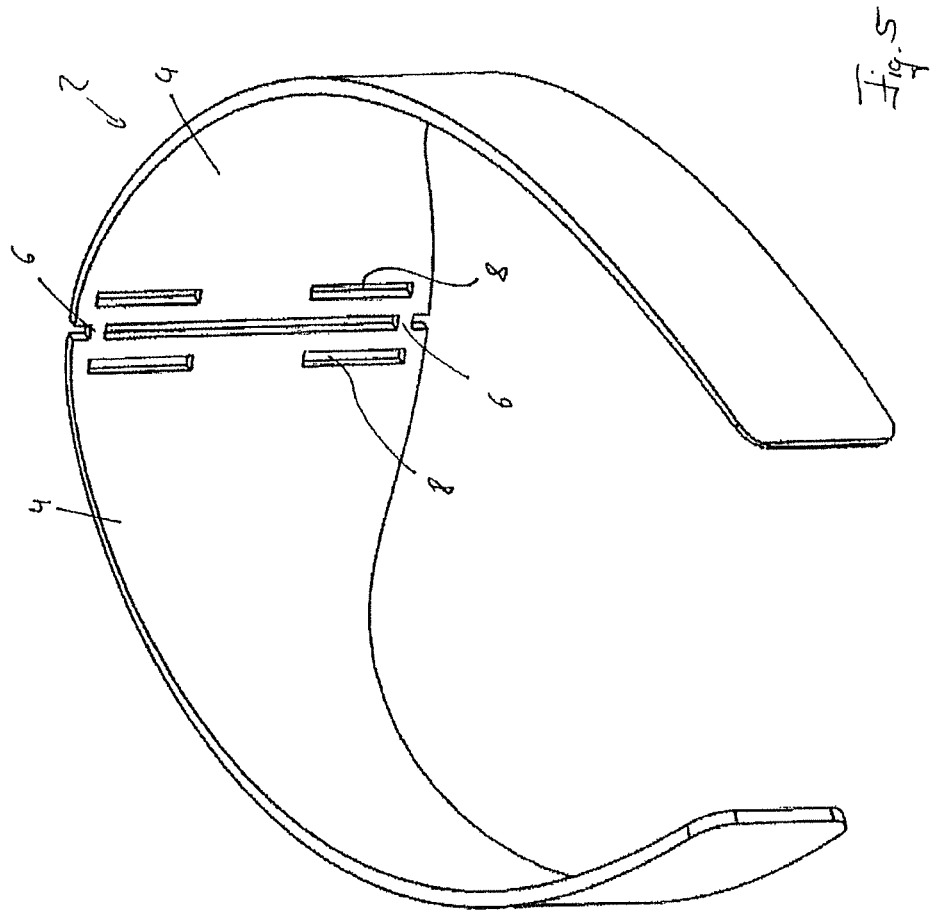

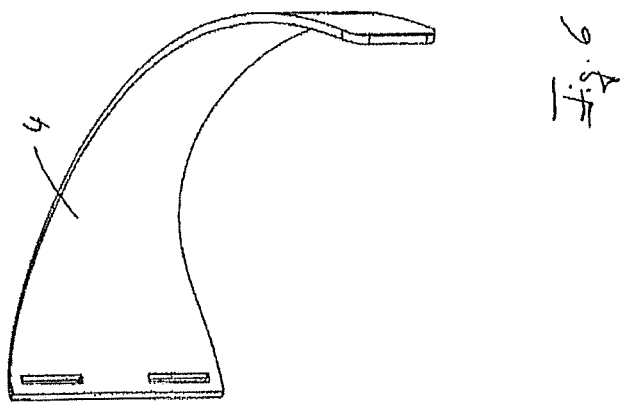
Fig. 9
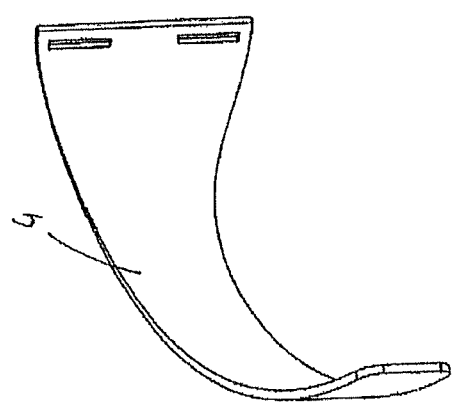

METHOD FOR PRODUCING A BODY ARMOR

The invention relates to a method for producing a body armor with several armor elements that are connected to one another.

This type of body armor has been known within the scope of the prior art for many years. It is available in various embodiments which can protect a body against a range of threats. Body armors may be designed as items of clothing, such as vests or jackets, or stationary elements. In principle, suits of armor are also conceivable.

Nowadays, a body armor generally has several armor elements that are connected to one another. This connection is made to be flexible so as to allow the wearer of the body armor as unrestricted a movement as possible. However, it must be ensured that the protection that the body armor is to provide is still guaranteed, in particular at the connection points of the armor elements and around the gaps between two connected armor elements.

Body armors of the variety described here may be designed to be armors that are resistant to stabs and blows, for example in the form of stab and/or blow-resistant vests or jackets. However, in principle bulletproof body armors are also possible.

The various armor elements are made of a material that is selected for the specific threat against which the body armor should provide protection. With blow and stab-resistant body armors in particular, metal plates, preferably aluminium plates, are used to act as an armor element. Other body armors may also make use of fiber-reinforced plastics, composite materials and ceramic elements.

In order to make the body armor as comfortable as possible for the wearer and to restrict the wearer's movement as little as possible, the armor elements are adapted to the shape of a human body. If the body armor is in the form of an item of clothing, different sizes and different "cutting patterns" for men and woman can be designed. The armor elements are designed in various geometric contours and shapes, for instance they are cut or punched, wherein the armor elements are designed to be flat and are predominantly two-dimensional. They are then given the respective three-dimensional form, for instance by way of reshaping methods such as a rolling or deep-drawing process, that is required for their use as an armor element.

The disadvantage is that with an increasing number of armor elements needed to make the armor comfortable to wear, the complexity of the production of such a body armor increases dramatically, as extremely different three-dimensional forms must be used to give the individual armor elements the desired shape.

The invention therefore aims to improve a method for producing a body armor in such a way that it becomes quicker and easier to produce.

The invention solves the problem by means of a method for producing a body armor with several armor elements that are connected to one another, wherein the method comprises the following steps:
a) supply of an armor blank with at least two armor elements which are connected to one another or in a fixed position relative to one another,
b) reshaping of the armor blank in at least one reshaping direction such that the at least two armour elements are reshaped,
c) separation of the at least two connected armor elements from one another and
d) flexible connection of the separated armor elements.

The structure of the method according to the invention means that the individual armor elements need not be brought into the desired shape separately and in separate forming steps: rather, it is possible to reshape the armor elements, which form part of the armor blank, at the same time, meaning that the number of required reshaping steps reduces considerably. This in turn means that the production time and therefore production costs can be reduced. In addition, it ensures that the different armor elements of the body armor that is eventually produced are optimally tailored to and aligned with one another.

The individual armor elements are connected to one another or positioned relative to one another in step a) of the method. This ensures that the individual armor elements are reshaped in a preset manner in step b) of the method. The fixed positioning of the armor elements relative to one another may be achieved, for example, by fixing the individual armor elements on or to a base. As a result, they cannot move relative to one another during the reshaping of the armor blank. The base may comprise fixing elements, such as mounting elements or recesses in the shape of the individual armor elements, similar to the style of a puzzle. Alternatively or additionally, the armor elements may also be fixed to the base by means of a soluble adhesive, for example.

In step d) of the method, the armor elements that have been separated from one another in step c) of the method are preferably flexibly connected to one another. It is especially preferable if the at least two armor elements of the armor blank are connected relative to one another in an arrangement in which they are also flexibly connected with one another in step d) of the method.

The armor blank preferably has as large a number of armor elements as possible, for instance four, five, six or eight. The larger the number of armor elements connected to one another in the armor blank, the greater the reduction in the number of required reshaping steps during the production of the body armor. In a preferred configuration, the armor blank already has all armor elements required for the body armor. In a body armor, the individual armor elements are flexibly connected with one another in a particular arrangement relative to one another. The lateral edges and geometric form elements of the adjacent armor elements, which indicate the respective neighboring element, are tailored to one another in order to preserve the desired properties, particularly in the gaps between the adjacent armor elements. In this area, the geometric form and three-dimensional shape of the armor elements must therefore be aligned with one another as optimally as possible in order to avoid, for instance with stab-resistant body armors, a sharp weapon being able to penetrate the gap between two armor elements in the event of an attack and thereby injure the wearer of the body armor. A precise alignment and careful moulding of the individual segments to each of their adjacent lateral edges is thus essential. This is guaranteed by the collective reshaping of at least two armor elements of the armor blank, preferably of course as many as possible, especially preferably all armor elements of the armor blank.

The at least two armor elements of the armor blank are preferably firmly bonded with one another, in particular they are welded or stuck together, or are configured as a single piece. It is especially preferable if, prior to its supply, the armor blank is produced—in particular cut or punched—from a metal plate, in particular an aluminium plate. Laser-cutting methods or jet-cutting methods may be used just as well as punching or standard cutting methods. Here, the individual armor elements are preferably cut out of a plate-shaped element, such as the metal plate, wherein they remain connected to one another via bars or are reconnected with one another at these points. It is especially preferable if the connected armor elements are already connected to one another in the position and direction that correspond to their position and direction in the finished body armor. If the armor elements are initially produced separately and then connected to one another, preferably by way of a firm bond, the amount of waste produced decreases, thereby enabling a further reduction in costs in this particular respect. However, the subsequent connection of the armor elements to the armor blank requires an additional step in the method.

The bars or elements by means of which the armor elements are connected to one another within the armor blank are disconnected in step c) of the method, such that the individual armor elements become detached from one another. They are subsequently flexibly connected to one another, preferably in the same direction and arrangement.

The reshaping device preferably comprises a rolling device with at least one reshaping roller or is preferably a rolling device with at least one reshaping roller. The reshaping roller preferably features different radii of curvature. Different radii of curvature may occur in different peripheral zones of the reshaping roller, such that the reshaping roller has no circular cross-section in these zones. Alternatively or additionally, the reshaping roller may also feature different radii of curvature along its axial direction, such that a longitudinal section is not rectangular. Of course, the two arrangements can be combined, meaning that highly irregularly shaped reshaping rollers can be used. As a result, a complete three-dimensional reshaping of the individual armor elements can be achieved without the need for separate and additional reshaping steps. It is especially preferable if the reshaping of the armor blank occurs in a single reshaping step. This results in a reduction of the number of steps required to the minimum and a further shortening of the production method.

The reshaping device may also comprise additional devices, such as at least one pressing device and/or at least one deep-drawing device and/or at least one punching device. For the reshaping of the armor blank in at least one of these devices, preferably in all available devices, preferably only one reshaping step is required to achieve the desired form of the armor blank.

The invention also solves the problem by means of a body armor that can be or is produced according to one of the methods described above. This armor preferably refers to protective clothing, in particular a protective vest, a protective jacket, a protective arm element, a protective leg element or a groin protector. The individual flexibly connected armor elements in this type of protective clothing are preferably integrated in such a way that they are not visible from the outside.

In the following, an example of an embodiment of the present invention will be explained in more detail by way of the attached drawings: They show:

FIG. 1—an armor blank,

FIG. 2—the armor elements of the armor blank from FIG. 1 in the connected state, FIG. 3—another configuration of an armor blank, FIG. 4—an enlarged section from FIG. 3, FIG. 5—the armor blank from FIG. 3 in the reshaped state, FIG. 6—the separated armor elements of the armor blank from FIG. 5 and FIG. 7—two armor elements and a base.

FIG. 1 shows an armor blank 2 with several armor elements 4, which are connected to one another via connection bars 6. The armor blank 2 from FIG. 1 contains all armor elements 4 that are required for a shoulder element of a body armor in the example of an embodiment depicted. FIG. 2 shows the arrangement of the armor elements 4 in the body armor. The upper-middle armor elements 4 are positioned relative to one another in the same direction and arrangement as they were arranged in the armor blank 2 shown in FIG. 1. All armor elements 4 in FIGS. 1 and 2 feature slits 8, which are arranged in such a way that the slits 8 of two armor elements 4 that are arranged adjacent to one another run parallel to one another. Connection elements are inserted into these slits 8, which enable a flexible connection of the individual armor elements 4 in the arrangement depicted in FIG. 2. Two of the armor elements from FIG. 1 also each comprise an additional connection element 10 by means of which these two armor elements 4 can be connected to one another. This is shown in FIG. 2. The two connection elements 10 connect the two armor elements 4 in the embodiment depicted. The three armor elements 4 depicted at the bottom in FIG. 1 are shown in the correct arrangement relative to one another; however, in the body armor that is eventually produced, they are arranged in the orientation shown in FIG. 2, i.e. rotated by 180°. The arrangement in FIG. 1 of the armor blank 2 is selected in order to reduce any possible waste.

FIG. 3 shows a schematic depiction of another armor blank 2 with two armor elements 4, which are also connected to one another via connection bars 6. This may refer to an adhesive point, welded connections or single-piece bars made from the same material as the armor blank 2. Each armor element 4 features slits 8, which are arranged parallel to one another in the example of an embodiment depicted. FIG. 4 contains an enlarged depiction of this part. The slits 8 are already arranged in the position required for a subsequent connection of the separated armor elements 4. The connection bars 6 in the example of an embodiment depicted are designed to be formed integrally with the armor elements 4, as the armor elements 4 and hence the armor blank 2 are cut from a single aluminium plate.

FIG. 5 shows the armor blank 2 from FIG. 3 after reshaping. It is clear that a curved configuration in FIG. 5 has developed from the two-dimensional flat form in FIG. 3. This may occur, for instance, by way of a reshaping step with a rolling device. The armor blank 2 features different radii of curvature in different zones. This can also be achieved in a single reshaping step, for example if the reshaping roller features different circumferential radii. In the following step of the method, the armor elements 4 are separated from one another. This is shown in FIG. 6. The connection bars 6 have been removed so the armor elements 4 are separated from one another. The armor elements 4 are flexibly connected to one another via connection elements known from the prior art so as to enable the wearer of the body armor to move.

FIG. 7 shows two armor elements 4 and a base 10. The base 10 has two recesses 12, into which the armor elements can be inserted. Due to the fact that the recesses 12 are adjusted in shape and size to fit the armor elements 4, the armor elements 4 cannot move in the recesses 12 and in particular they cannot shift relative to one another in such a way that they are in a fixed position relative to one another.

REFERENCE LIST 2 armor blank
4 armor element 6 connection bar
8 slit
10 base
12 recess

The invention claimed is:

1. A method for producing a body armor with several armor elements that are connected to one another, comprising:
   a) obtaining an armor blank with at least two armor elements connected to one another or in a fixed position relative to one another,
   b) reshaping of the armor blank in at least one reshaping direction such that the at least two armor elements are reshaped,
   c) separating of the at least two armor elements from one another to form separated and reshaped armor elements, and
   d) forming a flexible connection of two or more of the separated and reshaped armor elements.

2. The method according to claim 1, wherein in step d) of the method the separated and reshaped armor elements are flexibly connected with one another in a same arrangement having a same orientation or relative position as in step c.

3. The method according to claim 1 wherein the at least two armor elements of the armor blank are thinly bonded with one another or are configured as a single piece.

4. The method according to claim 1 wherein the obtaining step includes the step of cutting or punching the armor blank from a metal plate.

5. The method according to claim 1 wherein the reshaping step is performed with a reshaping device that comprises a rolling device with at least one reshaping roller.

6. The method according to claim 5, wherein the at least one reshaping roller features different radii of curvature.

7. The method according to claim 1 wherein the reshaping of the armor blank occurs in a single step.

* * * * *